(12) United States Patent
Liu et al.

(10) Patent No.: US 8,127,937 B2
(45) Date of Patent: *Mar. 6, 2012

(54) HIGH PERFORMANCE CROSS-LINKED POLYBENZOXAZOLE AND POLYBENZOTHIAZOLE POLYMER MEMBRANES

(75) Inventors: Chunqing Liu, Schaumburg, IL (US); Man-Wing Tang, Cerritos, CA (US); Raisa Serbayeva, Skokie, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/412,633

(22) Filed: Mar. 27, 2009

(65) Prior Publication Data
US 2010/0133186 A1 Jun. 3, 2010

(51) Int. Cl.
B01D 71/64 (2006.01)
B01D 71/66 (2006.01)
B01D 71/60 (2006.01)
B01D 59/12 (2006.01)
B01D 53/22 (2006.01)
B01D 61/00 (2006.01)

(52) U.S. Cl. .................. 210/500.39; 210/649; 210/652; 210/500.41; 210/500.4; 96/4; 96/13; 96/14

(58) Field of Classification Search .................. None
See application file for complete search history.

(56) References Cited

U.S. PATENT DOCUMENTS

| | | | |
|---|---|---|---|
| 3,133,132 A | 5/1964 | Loeb et al. | |
| 4,230,463 A | 10/1980 | Henis et al. | |
| 4,717,393 A | 1/1988 | Hayes | |
| 4,855,048 A | 8/1989 | Tang et al. | |
| 4,877,528 A | 10/1989 | Friesen et al. | |
| 5,409,524 A | 4/1995 | Jensvold et al. | |
| 5,679,131 A | 10/1997 | Obushenko | |
| 5,837,032 A | 11/1998 | Moll et al. | |
| 6,368,382 B1 | 4/2002 | Chiou | |
| 6,500,233 B1 | 12/2002 | Miller et al. | |
| 6,626,980 B2 | 9/2003 | Hasse et al. | |
| 6,663,805 B1 | 12/2003 | Ekiner et al. | |
| 6,896,717 B2 | 5/2005 | Pinnau et al. | |
| 6,955,712 B2 | 10/2005 | Yoon | |
| 7,048,846 B2 | 5/2006 | White et al. | |
| 7,052,793 B2 * | 5/2006 | Formato et al. ............... | 429/535 |
| 7,166,146 B2 | 1/2007 | Miller et al. | |
| 7,485,173 B1 | 2/2009 | Liu et al. | |
| 2004/0050250 A1 | 3/2004 | Pinnau et al. | |
| 2005/0268782 A1 | 12/2005 | Kulkarni et al. | |
| 2006/0138042 A1 | 6/2006 | Okamoto et al. | |
| 2007/0022877 A1 | 2/2007 | Marand et al. | |
| 2008/0300336 A1 | 12/2008 | Liu et al. | |
| 2009/0114089 A1 | 5/2009 | Liu et al. | |
| 2009/0277327 A1 | 11/2009 | Zhou et al. | |
| 2009/0277837 A1 | 11/2009 | Liu et al. | |
| 2009/0297850 A1 | 12/2009 | Jung et al. | |
| 2010/0133171 A1 | 6/2010 | Liu et al. | |
| 2010/0133187 A1 | 6/2010 | Liu et al. | |
| 2010/0133192 A1 | 6/2010 | Liu et al. | |
| 2010/0137124 A1 | 6/2010 | Liu et al. | |
| 2010/0242723 A1 | 9/2010 | Liu et al. | |
| 2010/0243567 A1 | 9/2010 | Liu et al. | |
| 2011/0072973 A1 | 3/2011 | Liu et al. | |
| 2011/0077312 A1 | 3/2011 | Liu et al. | |

FOREIGN PATENT DOCUMENTS

| | | | |
|---|---|---|---|
| GB | 2211193 A | * | 6/1989 |
| JP | 2004231875 A | | 8/2004 |
| KR | 100782959 B1 | | 12/2007 |
| WO | WO 91/16123 | | 10/1991 |

OTHER PUBLICATIONS

U.S. Appl. No. 12/412,629, filed Mar. 27, 2009, Liu et al.
U.S. Appl. No. 12/412,639, filed Mar. 27, 2009, Liu et al.
U.S. Appl. No. 12/412,643, filed Mar. 27, 2009, Liu et al.
U.S. Appl. No. 12/412,647, filed Mar. 27, 2009, Liu et al.
U.S. Appl. No. 12/412,649, filed Mar. 27, 2009, Liu et al.
U.S. Appl. No. 12/412,653, filed Mar. 27, 2009, Liu et al.
Yaghi, Omar M. et al, Metal-organic frameworks: a new class of porous materials, Microporous & Mesoporous. Mater., 73: 3 (2004) pp. 3-14.
Barsema, J.N. et al., "Intermediate polymer to carbon gas separation membranes based on Matrimid PI", J. Membr. Science, 238: 93 (2004) pp. 93-102.
Yaghi, Omar M. et al., Systematic Design of Pore Size and Functionality in Isoreticular MOFs & Their Application in Methane Storage, Science, 295: 469 (2002).

(Continued)

*Primary Examiner* — Krishnan S Menon
(74) *Attorney, Agent, or Firm* — Mark Goldberg

(57) ABSTRACT

In the present invention high performance cross-linked polybenzoxazole and polybenzothiazole polymer membranes and methods for making and using these membranes have been developed. The cross-linked polybenzoxazole and polybenzothiazole polymer membranes are prepared by: 1) first synthesizing polyimide polymers comprising pendent functional groups (e.g., —OH or —SH) ortho to the heterocyclic imide nitrogen and cross-linkable functional groups in the polymer backbone; 2) fabricating polyimide membranes from these polymers; 3) converting the polyimide membranes to polybenzoxazole or polybenzothiazole membranes by heating under inert atmosphere such as nitrogen or vacuum; and 4) finally converting the membranes to high performance cross-linked polybenzoxazole or polybenzothiazole membranes by a crosslinking treatment, preferably UV radiation. The membranes can be fabricated into any convenient geometry. The high performance cross-linked polybenzoxazole and polybenzothiazole polymer membranes of the present invention are suitable for a variety of liquid, gas, and vapor separations.

15 Claims, No Drawings

OTHER PUBLICATIONS

Dybtsev, Danil N. et al., Rigid and Flexible: A Highly Porous Metal0Organic Framework with Unusual Guest-Dependent Dynamic Behavior, Angew. Chem. Int. Ed., 43: 5033 (2004).

Tullos, Gordon L. et al., "Thermal Conversion of Hydroxy-Containing Imides to Benzoxazoles: Polymer and Model Compound Study", Macromolecules, 32, 3598 (1999).

Ho Bum Park et al., "Polymers with Cavities Tuned for Fast Selective Transport of Small Molecules and Ions", Science, 318, 254 (2007).

U.S. Appl. No. 13/165,939 filed Jun. 22, 2011, Liu et al.

Hsiao, "A new class of aromatic polybenzoxazoles containing ortho-phenylenedioxy groups", European Polymer Journal 40 (2004) 1127-1135.

Kim, "Gas permeation properties of polybenzoxazole membranes derived from the thermal rearrangement of poly (hydroxy amide)", The Membrane Society of Korea, 2007 Fall Conference, pp. 129-132.

* cited by examiner

HIGH PERFORMANCE CROSS-LINKED POLYBENZOXAZOLE AND POLYBENZOTHIAZOLE POLYMER MEMBRANES

BACKGROUND OF THE INVENTION

This invention pertains to high performance cross-linked polybenzoxazole and polybenzothiazole polymer membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and high selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, good permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through glassy polymers more slowly as compared to polymers with less stiff backbones. However, polymers which are more permeable are generally less selective than less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used commercially for natural gas upgrading, including the removal of carbon dioxide. Although CA membranes have many advantages, they are limited in a number of properties including selectivity, permeability, and in chemical, thermal, and mechanical stability. It has been found that polymer membrane performance can deteriorate quickly. The primary cause of loss of membrane performance is liquid condensation on the membrane surface. Condensation can be prevented by providing a sufficient dew point margin for operation, based on the calculated dew point of the membrane product gas. UOP's MemGuard™ system, a regenerable adsorbent system that uses molecular sieves, was developed to remove water as well as heavy hydrocarbons from the natural gas stream, hence, to lower the dew point of the stream. The selective removal of heavy hydrocarbons by a pretreatment system can significantly improve the performance of the membranes. Although these pretreatment systems can effectively perform this function, the cost is quite significant. In some projects, the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10 to 50% of the footprint of the whole membrane system. Removal of the pretreatment system from the membrane system has great economic impact, especially to offshore projects.

High-performance polymers such as polyimides (PIs), poly(trimethylsilylpropyne) (PTMSP), and polytriazole have been developed to improve membrane selectivity, permeability, and thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the stiff polymer matrix by the sorbed penetrant molecules such as $CO_2$ or $C_3H_6$. Plasticization of the polymer as represented by the membrane structure swelling and significant increases in the permeabilities of all components in the feed occurs above the plasticization pressure when the feed gas mixture contains condensable gases.

Aromatic polybenzoxazoles (PBOs), polybenzothiazoles (PBTs), and polybenzimidazoles (PBIs) are highly thermally stable ladderlike glassy polymers with flat, stiff, rigid-rod phenylene-heterocyclic ring units. The stiff, rigid ring units in such polymers pack efficiently, leaving very small penetrant-accessible free volume elements that are desirable for polymer membranes with both high permeability and high selectivity. These aromatic PBO, PBT, and PBI polymers with high thermal and chemical stability, however, have poor solubility in common organic solvents, preventing them from being used as common polymer materials for making polymer membranes by the most practical solvent casting method. Thermal conversion of soluble aromatic polyimides containing pendent functional groups ortho to the heterocyclic imide nitrogen in the polymer backbone to aromatic polybenzoxazoles (PBOs) or polybenzothiazoles (PBTs) could provide an alternative method for creating PBO or PBT polymer membranes that are difficult or impossible to obtain directly from PBO or PBT polymers by solvent casting method. (Tullos et al, MACROMOLECULES, 32, 3598 (1999))

On the other hand, some inorganic molecular sieve membranes such as SAPO-34 and carbon molecular sieve membranes offer much higher permeability and selectivity than polymeric membranes for gas separations, but are high cost, have poor mechanical stability, and are difficult for large-scale manufacture. Therefore, it is still highly desirable to provide an alternate cost-effective membrane with improved separation properties.

In U.S. Pat. No. 5,409,524, a number of different polymer membranes were treated by heating the membrane to relax excess free volume in the polymer. This would tend to decrease the permeability of the polymer. The heating of the membrane was in a temperature range from 60 to 300° C. The membranes were then irradiated with UV radiation in the presence of oxygen to at least partially oxidize the surface. One of the membranes that were reported treated was a polybenzoxazole membrane. The polybenzoxazole polymer was prepared by a one-step polycondensation synthesis procedure and the membrane prepared from this polybenzoxazole polymer was heat treated at about 180° C. The membrane films exhibited about a 25% decrease in permeability from 12.25 Barrer to 9.11 Barrer and about a 15% increase in oxygen/nitrogen selectivity from 5.34 to 6.21. These conditions produced a minor increase in selectivity compared to the present invention which used different starting materials as well as a significantly higher membrane treating temperature.

A recent publication in the journal SCIENCE reported a new type of high permeability polybenzoxazole polymer membranes for gas separations (Ho Bum Park et al, SCIENCE 318, 254 (2007)). These polybenzoxazole membranes are prepared from high temperature thermal rearrangement of hydroxy-containing polyimide polymer membranes containing pendent hydroxyl groups ortho to the heterocyclic imide nitrogen. These polybenzoxazole polymer membranes exhibited extremely high $CO_2$ permeability (>1000 Barrer) which is about 100 times better than conventional polymer membranes and similar to that of some inorganic molecular sieve membranes but the $CO_2/CH_4$ selectivity was similar to commercial cellulose acetate membranes. Improved selectivity is needed for these membranes to be of commercial use. The authors tried to increase the selectivity of these polybenzoxazole polymer membranes by adding small acidic dopants (e.g., HCl and $H_3PO_4$). However, the stability of the small acidic dopants in these polybenzoxazole polymer membranes is a critical issue for commercial use.

In US 2008/0300336 A1, it was reported that the use of UV crosslinking did succeed in improving the properties of certain mixed matrix membranes that contain molecular sieves that function to improve the permeability and selectivity of the membranes. However, it was necessary to both crosslink the polymer and to add the molecular sieves to obtain the improved levels of performance reported therein. It is highly desired to have improved polymeric membranes that do not contain molecular sieves both to avoid the need to disperse the molecular sieves and to eliminate any problems caused by the lack of adhesion between the polymer and the molecular sieves.

The present invention overcomes the problems of both the prior art polymer membranes and inorganic molecular sieve membranes by providing a new type of high performance cross-linked polybenzoxazole and polybenzothiazole polymer membranes and a route to make said membranes that have the following properties/advantages: ease of processability, both high selectivity and high permeation rate or flux, high thermal stability, and stable flux and sustained selectivity over time by resistance to solvent swelling, plasticization and hydrocarbon contaminants. These membranes provide much better permeability when compared to crosslinked polyimide membranes and much better selectivity when compared to uncrosslinked polybenzoxazole membranes.

SUMMARY OF THE INVENTION

This invention pertains to high performance cross-linked polybenzoxazole and polybenzothiazole polymer membranes and methods for making and using these membranes.

The high performance cross-linked polybenzoxazole and polybenzothiazole polymer membranes are prepared from cross-linkable polyimide polymers comprising both UV cross-linkable functional groups in the polymer backbone and pendent functional groups (e.g., —OH or —SH groups) ortho to the heterocyclic imide nitrogen by thermal conversion followed by UV radiation. The high performance cross-linked polybenzoxazole and polybenzothiazole polymer membranes described in the current invention comprise polybenzoxazole or polybenzothiazole polymer chain segments wherein at least a part of these polymer chain segments are cross-linked to each other through possible direct covalent bonds by exposure to UV radiation. The cross-linking of the polybenzoxazole and polybenzothiazole polymer membranes offers the membranes significantly improved membrane selectivity and chemical and thermal stability.

The cross-linked polybenzoxazole and polybenzothiazole polymer membranes overcome the problems of both the prior art polymer membranes and inorganic molecular sieve membranes with advantages of ease of processability, high selectivity, high permeation rate or flux, high thermal stability, and stable flux and sustained selectivity over time by resistance to solvent swelling, plasticization and hydrocarbon contaminants.

A method for the production of the high performance cross-linked polybenzoxazole and polybenzothiazole polymer membranes comprises: 1) first synthesizing aromatic polyimide polymers comprising pendent functional groups (e.g., —OH or —SH) ortho to the heterocyclic imide nitrogen and UV cross-linkable functional groups (e.g., carbonyl group) in the polymer backbone; 2) fabricating polyimide membranes from the aromatic polyimide polymers synthesized in step 1); 3) converting the polyimide membranes to polybenzoxazole or polybenzothiazole membranes by heating between 300° and 600° C. under inert atmosphere, such as argon, nitrogen, or vacuum; and 4) finally converting the polybenzoxazole or polybenzothiazole membranes to cross-linked polybenzoxazole or polybenzothiazole polymer membranes by exposure to UV radiation. In some cases a membrane post-treatment step can be added after the exposure to UV radiation in which the selective layer surface of the cross-linked polybenzoxazole or polybenzothiazole polymer membranes is coated with a thin layer of high permeability material such as a polysiloxane, a fluoro-polymer, a thermally curable silicone rubber, or a UV radiation curable epoxy silicone.

The cross-linked polybenzoxazole and polybenzothiazole polymer membranes can have either a nonporous symmetric structure or an asymmetric structure with a thin nonporous dense selective layer supported on top of a porous support layer. These membranes can be fabricated into any convenient geometry such as flat sheet (or spiral wound), disk, tube, hollow fiber, or thin film composite.

The invention provides a process for separating at least one gas or liquid from a mixture of gases or liquids using either the cross-linked polybenzoxazole polymer membrane or the cross-linked polybenzothiazole polymer membrane. The process comprises providing a cross-linked polybenzoxazole or polybenzothiazole polymer membrane which is permeable to at least one gas or liquid; contacting the mixture of gases or liquids on one side of the cross-linked polybenzoxazole or polybenzothiazole polymer membrane to cause at least one gas or liquid to permeate the cross-linked polybenzoxazole or polybenzothiazole polymer membrane; and removing from the opposite side of the membrane a permeate gas or liquid composition that is a portion of at least one gas or liquid which permeated the membrane.

The high performance cross-linked polybenzoxazole and polybenzothiazole polymer membranes are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

In 1999, Tullos et al. reported the synthesis of a series of hydroxy-containing polyimide polymers containing pendent hydroxyl groups ortho to the heterocyclic imide nitrogen. These polyimides were found to undergo thermal conversion to polybenzoxazoles upon heating between 350° and 500° C. under nitrogen or vacuum. (Tullos et al, MACROMOLECULES, 32, 3598 (1999)) A recent publication in SCIENCE reported a further study that the polybenzoxazole polymer materials reported by Tullos et al. possessed tailored free volume elements with well-connected morphology. The unusual microstructure in these polybenzoxazole polymer materials can be systematically tailored using thermally-driven segment rearrangement, providing a route for preparing polybenzoxazole polymer membranes for gas separations. See Ho Bum Park et al, SCIENCE, 318, 254 (2007). These polybenzoxazole polymer membranes exhibited extremely high $CO_2$ permeability (>1000 Barrer) which is about 100 times better than conventional polymer membranes and similar to that of some inorganic molecular sieve membranes but lower $CO_2/CH_4$ selectivity than that of some small pore inorganic molecular sieve membranes for $CO_2/CH_4$ separation.

The present invention involves novel high performance cross-linked polybenzoxazole and polybenzothiazole polymer membranes and methods for making and using these membranes.

The present invention overcomes the problems of both the prior art polymer membranes and inorganic molecular sieve membranes by providing a new type of high performance cross-linked polybenzoxazole and polybenzothiazole polymer membranes and a route to make these membranes that have the properties/advantages of ease of processability, both high selectivity and high permeation rate or flux, high thermal stability, and stable flux and sustained selectivity over time by resistance to solvent swelling, plasticization and deterioration by exposure to hydrocarbon contaminants.

The high performance cross-linked polybenzoxazole and polybenzothiazole polymer membranes described in the current invention are prepared from cross-linkable polyimide polymers comprising both UV cross-linkable functional groups (e.g., carbonyl group) in the polymer backbone and pendent functional groups (e.g., —OH or —SH) ortho to the heterocyclic imide nitrogen via thermal conversion followed by UV radiation. The membranes comprise polybenzoxazole or polybenzothiazole polymer chain segments wherein at least a portion of these polymer chain segments are cross-linked to each other through direct covalent bonds by exposure to UV radiation. The cross-linking of the polybenzoxazole and polybenzothiazole polymer membranes offers the membranes significantly improved membrane selectivity and chemical and thermal stabilities.

The present invention provides a method for the production of these high performance cross-linked polybenzoxazole and polybenzothiazole polymer membranes by: 1) first synthesizing aromatic polyimide polymers comprising pendent functional groups (e.g., —OH or —SH) ortho to the heterocyclic imide nitrogen and UV cross-linkable functional groups (e.g., carbonyl group) in the polymer backbone; 2) fabricating polyimide membranes from the aromatic polyimide polymers synthesized in step 1); 3) converting the polyimide membranes to polybenzoxazole or polybenzothiazole membranes by heating between 300° and 600° C. under inert atmosphere, such as argon, nitrogen, or vacuum; and 4) finally converting the polybenzoxazole or polybenzothiazole membranes to cross-linked polybenzoxazole or polybenzothiazole polymer membranes by exposure to UV radiation. In some cases a membrane post-treatment step can be added after the UV radiation in which the selective layer surface of the cross-linked polybenzoxazole or polybenzothiazole polymer membranes are coated with a thin layer of high permeability material such as a polysiloxane, a fluoro-polymer, a thermally curable silicone rubber, or a UV radiation curable epoxy silicone.

The polybenzoxazole-type and polybenzothiazole-type of polymer membranes used in the present invention for the preparation of cross-linked polybenzoxazole and polybenzothiazole polymer membranes are prepared from thermal conversion of polyimide membranes upon heating between 300° and 600° C. under inert atmosphere, such as argon, nitrogen, or vacuum. The polyimide membranes are fabricated from soluble polyimides with UV cross-linkable functional groups in the polymer backbone (e.g., carbonyl group) and pendent functional groups (e.g., —OH or —SH) ortho to the heterocyclic imide nitrogen by a solution casting or solution spinning method. The thermal conversion of the polyimide with pendent functional groups (e.g., —OH or —SH) ortho to the heterocyclic imide nitrogen results in the formation of polybenzoxazole (if the pendent functional groups are —OH groups) or polybenzothiazole (if the pendent functional groups are —SH groups) by irreversible molecular rearrangement, and is accompanied by loss of carbon dioxide with no other volatile byproducts being generated. The polybenzoxazole and polybenzothiazole polymers comprise the repeating units of a formula (I), wherein said formula (I) is:

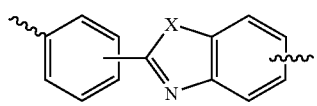 (I)

where X of said formula (I) is O for polybenzoxazoles or S for polybenzothiazoles.

The UV cross-linkable polyimide polymers containing pendent functional groups ortho to the heterocyclic imide nitrogen, that are used for the preparation of high performance cross-linked polybenzoxazole-type and polybenzothiazole-type of membranes in the present invention comprise a plurality of first repeating units of a formula (II), wherein formula (II) is:

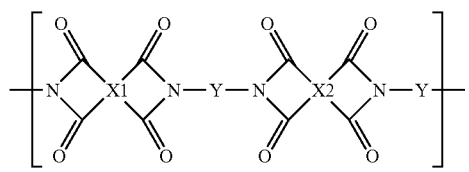 (II)

where X1 of formula (II) is

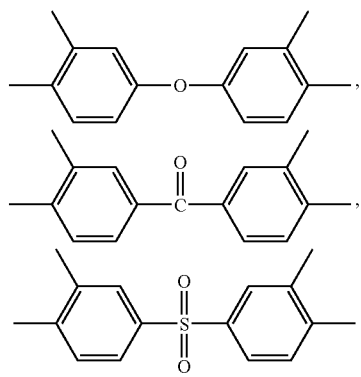

or mixtures thereof, X2 of formula (II) is either the same as X1 or is selected from

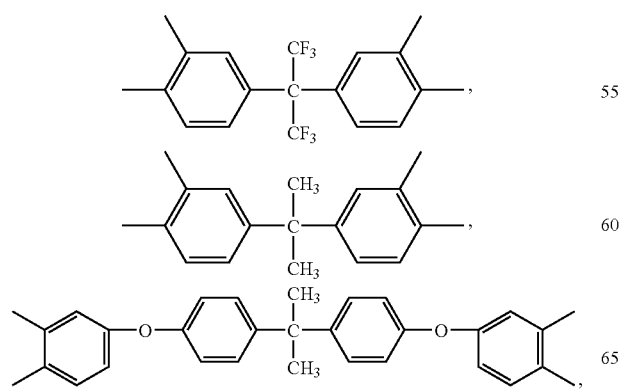

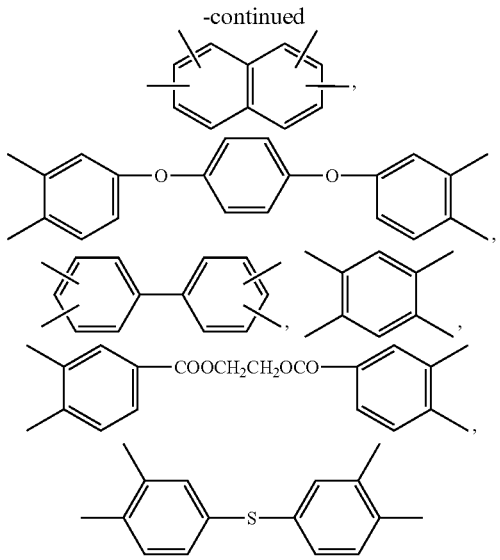

or mixtures thereof, —Y— of formula (II) is

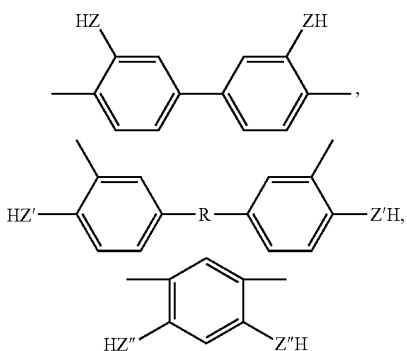

or mixtures thereof, —Z—, —Z'—, and —Z"— are independently —O— or —S—, —R— is

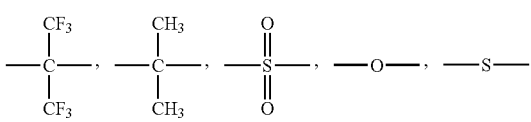

or mixtures thereof.

In one embodiment of the invention, when the preferred X1 and X2 of formula (II) are the same, they are selected from the group of:

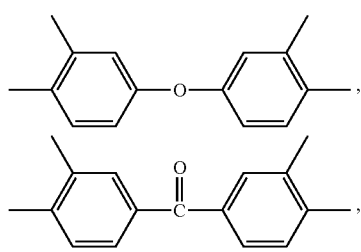

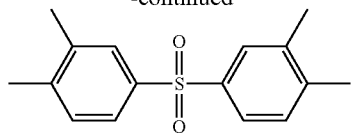

or mixtures thereof, and Y of formula (II) is selected from the group of:

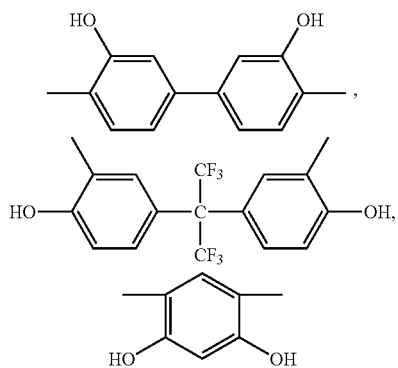

or mixtures thereof.

In another embodiment of the invention, X1 of formula (II) is selected from the group of:

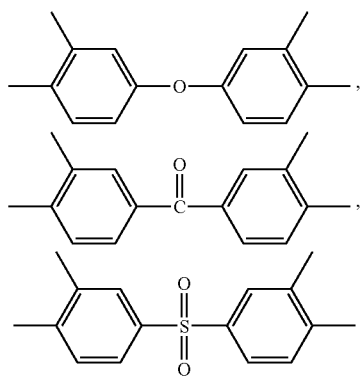

or mixtures thereof, X2 of said formula (II) is selected from the group of:

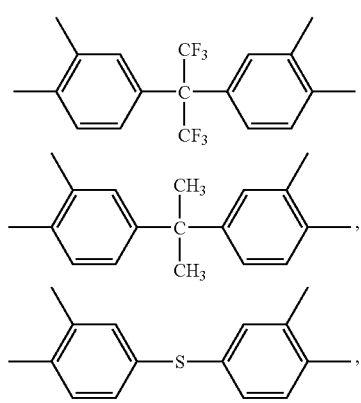

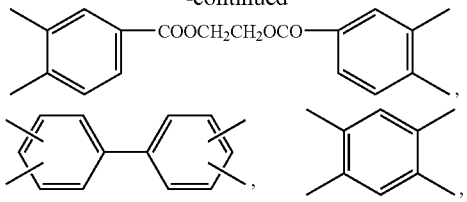

or mixtures thereof, Y of formula (II) is selected from the group of:

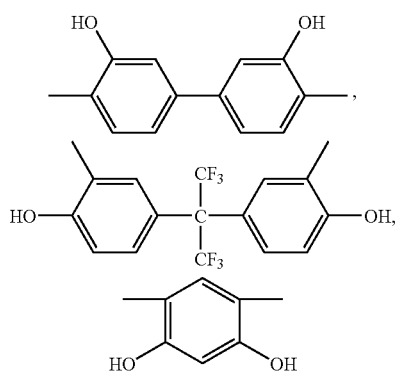

or mixtures thereof.

Some of the preferred polyimide polymers that are used for the preparation of high performance cross-linked polybenzoxazole and polybenzothiazole membranes in the present invention include, but are not limited to, poly[3,3',4,4'-benzophenonetetracarboxylic dianhydride-2,2-bis(3-amino-4-hydroxyphenyl)-hexafluoropropane] (poly(BTDA-APAF)), poly[4,4'-oxydiphthalic anhydride-2,2-bis(3-amino-4-hydroxyphenyl)-hexafluoropropane] (poly(ODPA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl)hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The polyimides comprising UV cross-linkable functional groups and pendent functional groups (e.g., —OH or —SH) ortho to the heterocyclic imide nitrogen in the polymer backbone that are used for the preparation of the cross-linked polybenzoxazole and polybenzothiazole polymer membranes in the present invention are synthesized from diamines and dianhydrides in polar solvents such as 1-methyl-2-pyrrolidinone (NMP) or N,N-dimethylacetamide (DMAc) by a two-step process involving the formation of the poly(amic acid)s followed by a solution imidization or a thermal imidization. Acetic anhydride is used as the dehydrating agent and pyridine (or triethylamine) is used as the imidization catalyst for the solution imidization reaction. More information regarding the preparation of these polymers can be found in Tullos et al, MACROMOLECULES, 32, 3598 (1999).

The polyimide membrane that is used for the preparation of high performance cross-linked polybenzoxazole-type or polybenzothiazole-type of membrane in the present invention can be fabricated into a membrane with nonporous symmetric thin film geometry from the polyimide polymer comprising UV cross-linkable functional groups and pendent functional groups (e.g., —OH or —SH) ortho to the heterocyclic imide nitrogen in the polymer backbone by casting a homogeneous polyimide solution on top of a clean glass plate and allowing the solvent to evaporate slowly inside a plastic cover for at least 12 hours at room temperature. The membrane is then detached from the glass plate and dried at room temperature for 24 hours and then at 200° C. for at least 48 hours under vacuum.

The solvents used for dissolving the polyimide polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The polyimide membrane that is used for the preparation of high performance cross-linked polybenzoxazole-type or polybenzothiazole-type of membrane in the present invention can also be fabricated by a method comprising the steps of: dissolving the polyimide polymer in a solvent to form a solution of the polyimide material; contacting a porous membrane support (e.g., a support made from inorganic ceramic material) with this solution; and then evaporating the solvent to provide a thin selective layer comprising the polyimide polymer material on the supporting layer.

The polyimide membrane can also be fabricated as an asymmetric membrane with a flat sheet or hollow fiber geometry by phase inversion followed by direct air drying through the use of at least one drying agent which is a hydrophobic organic compound such as a hydrocarbon or an ether (see U.S. Pat. No. 4,855,048). The polyimide membrane can also be fabricated as an asymmetric membrane with flat sheet or hollow fiber geometry by phase inversion followed by solvent exchange (see U.S. Pat. No. 3,133,132).

The polyimide membrane is then converted to a polybenzoxazole or polybenzothiazole polymer membrane by heating between 300° C. and 600° C., preferably from about 400° C. to 500° C. and most preferably from about 400° C. to 450° C. under inert atmosphere, such as argon, nitrogen, or vacuum. The heating time for this heating step is in a range of about 30 seconds to 2 hours. A more preferred heating time is from 30 seconds to 1 hour. The cross-linked polybenzoxazole or polybenzothiazole polymer membrane is then formed by UV-cross-linking the polybenzoxazole or polybenzothiazole polymer membrane using a UV lamp from a predetermined distance and for a period of time selected based upon the separation properties sought. For example, a cross-linked polybenzoxazole or polybenzothiazole polymer membrane can be prepared from a polybenzoxazole or polybenzothiazole polymer membrane by exposure to UV radiation using 254 nm wavelength UV light generated from a UV lamp with 1.9 cm (0.75 inch) distance from the membrane surface to the UV lamp and a radiation time of 30 minutes at less than 50° C. The UV lamp described here is a low pressure, mercury arc immersion UV quartz 12 watt lamp with 12 watt power supply from Ace Glass Incorporated. Optimization of the cross-linking degree in the cross-linked polybenzoxazole and polybenzothiazole polymer membranes should promote the tailoring of the membranes for a wide range of gas and liquid separations with improved permeation properties and environmental stability. The cross-linking degree of the cross-linked polybenzoxazole and polybenzothiazole polymer membranes can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 0.5 minute to 1 hour. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 0.5 to 40 minutes.

In some cases a membrane post-treatment step can be added after the formation of the cross-linked polybenzoxazole or polybenzothiazole polymer membrane with the application of a thin layer of a high permeability material such as a polysiloxane, a fluoro-polymer, a thermally curable silicone rubber, or a UV radiation curable epoxy silicone. The coating filling the surface pores and other imperfections comprising voids (see U.S. Pat. Nos. 4,230,463; 4,877,528; 6,368,382).

The high performance cross-linked polybenzoxazole and polybenzothiazole polymer membranes of the present invention can have either a nonporous symmetric structure or an asymmetric structure with a thin nonporous dense selective layer supported on top of a porous support layer. The porous support can be made from the same cross-linked polybenzoxazole or polybenzothiazole polymer material or a different type of organic or inorganic material with high thermal stability. The high performance cross-linked polybenzoxazole and polybenzothiazole polymer membranes of the present invention can be fabricated into any convenient geometry such as flat sheet (or spiral wound), disk, tube, hollow fiber, or thin film composite.

The invention provides a process for separating at least one gas or liquid from a mixture of gases or liquids using the cross-linked polybenzoxazole and polybenzothiazole polymer membranes, the process comprising: (a) providing a cross-linked polybenzoxazole or polybenzothiazole polymer membrane which is permeable to at least one gas or liquid; (b) contacting the mixture to one side of the cross-linked polybenzoxazole or polybenzothiazole polymer membrane to cause at least one gas or liquid to permeate the cross-linked polybenzoxazole or polybenzothiazole polymer membrane; and (c) then removing from the opposite side of the membrane a permeate gas or liquid composition comprising a portion of at least one gas or liquid which permeated the membrane.

These high performance cross-linked polybenzoxazole and polybenzothiazole polymer membranes are especially useful in the purification, separation or adsorption of a particular species in the liquid or gas phase. In addition to separation of pairs of gases, these high performance cross-linked polybenzoxazole and polybenzothiazole polymer membranes may, for example, be used for the desalination of water by reverse osmosis or for the separation of proteins or other thermally unstable compounds, e.g. in the pharmaceutical and biotechnology industries. The high performance cross-linked polybenzoxazole and polybenzothiazole polymer membranes may also be used in fermenters and bioreactors to transport gases into the reaction vessel and transfer cell culture medium out of the vessel. Additionally, the high performance cross-linked polybenzoxazole and polybenzothiazole polymer membranes may be used for the removal of microorganisms from air or water streams, water purification, ethanol production in a continuous fermentation/membrane pervaporation system, and in detection or removal of trace compounds or metal salts in air or water streams.

The cross-linked polybenzoxazole and polybenzothiazole polymer membranes of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the cross-linked polybenzoxazole or polybenzothiazole polymer membranes described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the membranes of the present invention will range from about −20° to about 100° C., and most preferably, the effective operating temperature of the membranes of the present invention will range from about 25° to about 100° C.

The cross-linked polybenzoxazole and polybenzothiazole polymer membranes are especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these cross-linked polybenzoxazole and polybenzothiazole polymer membranes may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The cross-linked polybenzoxazole and polybenzothiazole polymer membranes may incorporate a species that adsorbs strongly to certain gases (e.g. cobalt porphyrins or phthalocyanines for $O_2$ or silver(I) for ethane) to facilitate their transport across the membrane.

The cross-linked polybenzoxazole and polybenzothiazole polymer membranes can be operated at high temperature to provide the sufficient dew point margin for natural gas upgrading (e.g, $CO_2$ removal from natural gas). The cross-linked polybenzoxazole and polybenzothiazole polymer membranes can be used in either a single stage membrane or as the first and/or second stage membrane in a two stage membrane system for natural gas upgrading. The high performance cross-linked polybenzoxazole and polybenzothiazole polymer membranes with high selectivity, high permeance, and high thermal and chemical stabilities of the present invention allow the membranes to be operated without a costly pretreatment system. Hence, a costly membrane pretreatment system such as an adsorbent MemGuard™ system would not be required in the new process containing the cross-linked polybenzoxazole or polybenzothiazole polymer membrane system. Due to the elimination of the pretreatment system and the significant reduction of membrane area, the new process can achieve significant capital cost saving and reduce the existing membrane footprint.

These cross-linked polybenzoxazole and polybenzothiazole polymer membranes may also be used in the separation of liquid mixtures by pervaporation, such as in the removal of organic compounds (e. g., alcohols, phenols, chlorinated hydrocarbons, pyridines, ketones) from water such as aqueous effluents or process fluids. The cross-linked polybenzoxazole or polybenzothiazole polymer membrane which is ethanol-selective would be used to increase the ethanol concentration in relatively dilute ethanol solutions (5-10% ethanol) obtained by fermentation processes. Another liquid phase separation example using these cross-linked polybenzoxazole and polybenzothiazole polymer membranes is the deep desulfurization of gasoline and diesel fuels by a pervaporation membrane process similar to the process described in U.S. Pat. No. 7,048,846, incorporated by reference herein in its entirety. The cross-linked polybenzoxazole and polybenzothiazole polymer membranes that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e. g. to separate isomers of organic compounds. Mixtures of organic compounds which may be separated using the cross-linked polybenzoxazole or polybenzothiazole polymer membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The cross-linked polybenzoxazole and polybenzothiazole polymer membranes may be used for separation of organic molecules from water (e.g. ethanol and/or phenol from water by pervaporation) and removal of metal and other organic compounds from water.

The cross-linked polybenzoxazole and polybenzothiazole polymer membranes have immediate application for the separation of gas mixtures including carbon dioxide removal from natural gas. The membrane permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

The cross-linked polybenzoxazole and polybenzothiazole polymer membranes also have immediate application to concentrate olefin in a paraffin/olefin stream for olefin cracking application. For example, the cross-linked polybenzoxazole and polybenzothiazole polymer membranes can be used for propylene/propane separation to increase the concentration of the effluent in a catalytic dehydrogenation reaction for the production of propylene from propane and isobutylene from isobutane. Therefore, the number of stages of propylene/propane splitter that is required to get polymer grade propylene can be reduced. Another application for the cross-linked polybenzoxazole and polybenzothiazole polymer membranes is for separating isoparaffin and normal paraffin in light paraffin isomerization and MaxEne™, a process for enhancing the concentration of normal paraffin (n-paraffin) in the naphtha cracker feedstock, which can be then converted to ethylene.

An additional application of the cross-linked polybenzoxazole and polybenzothiazole polymer membranes is as the separator in chemical reactors to enhance the yield of equilibrium-limited reactions by selective removal of a specific substance.

In summary, the high performance cross-linked polybenzoxazole and polybenzothiazole polymer membranes of the present invention are suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations.

EXAMPLES

The following examples are provided to illustrate one or more preferred embodiments of the invention, but are not limited embodiments thereof. Numerous variations can be made to the following examples that lie within the scope of the invention.

Example 1

Synthesis of poly(BTDA-APAF) polyimide

An aromatic poly[3,3',4,4'-benzophenonetetracarboxylic dianhydride-2,2-bis(3-amino-4-hydroxyphenyl)-hexafluoropropane] (poly(BTDA-APAF)) polyimide containing UV cross-linkable carbonyl groups and pendent —OH functional groups ortho to the heterocyclic imide nitrogen in the polymer backbone was synthesized from 2,2-bis(3-amino-4-hydroxyphenyl)-hexafluoropropane diamine (BTDA) and 3,3',4,4'-benzophenonetetracarboxylic dianhydride (APAF) in NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 10.0 g (27.3 mmol) of APAF and 40 mL of NMP. Once the APAF was fully dissolved, a solution of BTDA (8.8 g, 27.3 mmol) in 40 mL of NMP was added to the APAF solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 hour at 80° C. to yield the poly(BTDA-APAF) polyimide. The poly(BTDA-APAF) polyimide product in a fine fiber form was recovered by slowly precipitating the reaction mixture into a large amount of methanol. The resultant poly (BTDA-APAF) polyimide fibers were then thoroughly rinsed with methanol and dried in a vacuum oven at 150° C. for 24 hours.

Example 2

Synthesis of poly(ODPA-APAF) polyimide

The aromatic poly[4,4'-oxydiphthalic anhydride-2,2-bis (3-amino-4-hydroxyphenyl)-hexafluoropropane] (poly (ODPA-APAF)) polyimide containing pendent —OH functional groups ortho to the heterocyclic imide nitrogen in the polymer backbone was synthesized from 4,4'-oxydiphthalic anhydride (ODPA) and 2,2-bis(3-amino-4-hydroxyphenyl)-hexafluoropropane (APAF) in NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 10.0 g (27.3 mmol) of APAF and 20 mL of NMP. Once APAF was fully dissolved, a solution of ODPA (8.88 g, 27.3 mmol) in 35 mL of NMP was added to the APAF solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 h at 80° C. to yield the poly(ODPA-APAF) polyimide. The poly(ODPA-APAF) polyimide product in a fine fiber form was recovered by slowly precipitating the reaction mixture into a large amount of methanol. The resultant poly(ODPA-APAF) polyimide fibers were then thoroughly rinsed with methanol and dried in a vacuum oven at 150° C. for 24 hours.

Example 3

Preparation of poly(BTDA-APAF) Polymer Membrane

The poly(BTDA-APAF) polymer membrane was prepared as follows: 4.0 g of poly(BTDA-APAF) polyimide synthesized in Example 1 was dissolved in a solvent mixture of 12.0 g of NMP and 12.0 g of 1,3-dioxolane. The mixture was mechanically stirred for 2 h to form a homogeneous casting dope. The resulting homogeneous casting dope was allowed to degas overnight. The poly(BTDA-APAF) polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(BTDA-APAF) polymer membrane.

Example 4

Preparation of polybenzoxazole Polymer Membrane PBO(BTDA-APAF-450C) (Abbreviated as PBO(BTDA-APAF))

The polybenzoxazole polymer membrane PBO(BTDA-APAF-450C) was prepared by thermally heating the poly (BTDA-APAF) polymer membrane prepared in Example 3 from 50° C. to 450° C. at a heating rate of 5° C./min under $N_2$ flow. The membrane was hold for 1 hour at 450° C. and then cooled down to 50° C. at a heating rate of 5° C./min under $N_2$ flow.

Example 5

Preparation of Cross-linked PBO(BTDA-APAF-450C) polybenzoxazole Polymer Membrane (Abbreviated as Cross-linked PBO(BTDA-APAF-450C))

Cross-linked PBO(BTDA-APAF-450C) polymer membrane was prepared by UV cross-linking the PBO(BTDA-APAF-450C) polymer membrane prepared in Example 4 by exposure to UV radiation using 254 nm wavelength UV light generated from a UV lamp with 1.9 cm (0.75 inch) distance from the membrane surface to the UV lamp and a radiation time of 20 minutes at 50° C. The UV lamp that was used was a low pressure, mercury arc immersion UV quartz 12 watt lamp with 12 watt power supply from Ace Glass Incorporated.

Example 6

Preparation of poly(ODPA-APAF) Polymer membrane

The poly(ODPA-APAF) polymer membrane was prepared using similar procedures as described in Example 3, but poly (BTDA-APAF) polyimide synthesized in Example 2 was used in this example.

Example 7

Preparation of polybenzoxazole Polymer Membrane PBO(ODPA-APAF-450C) (Abbreviated as PBO(ODPA-APAF-450C))

The polybenzoxazole polymer membrane PBO(ODPA-APAF-450C) was prepared by thermally heating the poly (ODPA-APAF) polymer membrane prepared in Example 6 using similar procedures as described in Example 4.

Example 8

Preparation of polybenzoxazole Polymer Membrane PBO(ODPA-APAF-400C) (Abbreviated as PBO(ODPA-APAF-400C))

The polybenzoxazole polymer membrane PBO(ODPA-APAF-400C) was prepared by thermally heating the poly (ODPA-APAF) polymer membrane prepared in Example 6 from 50° C. to 400° C. at a heating rate of 5° C./min under $N_2$ flow. The membrane was hold for 1 hour at 400° C. and then cooled down to 50° C. at a heating rate of 5° C./min under $N_2$ flow.

Example 9

Preparation of Cross-linked PBO(ODPA-APAF-450C) polybenzoxazole Polymer Membrane (Abbreviated as Cross-linked PBO(ODPA-APAF-450C))

Cross-linked PBO(ODPA-APAF-450C) polymer membrane was prepared by UV cross-linking the PBO(ODPA-APAF-450C) polymer membrane prepared in Example 7 by exposure to UV radiation using 254 nm wavelength UV light generated from a UV lamp with 1.9 cm (0.75 inch) distance from the membrane surface to the UV lamp and a radiation time of 20 minutes at 50° C. The UV lamp that was used was a low pressure, mercury arc immersion UV quartz 12 watt lamp with 12 watt power supply from Ace Glass Incorporated.

Example 10

Preparation of Cross-linked PBO(ODPA-APAF-400C) polybenzoxazole Polymer Membrane (Abbreviated as Cross-linked PBO(ODPA-APAF-400C))

Cross-linked PBO(ODPA-APAF-400C) polymer membrane was prepared by UV cross-linking the PBO(ODPA-APAF-400C) polymer membrane prepared in Example 8 by exposure to UV radiation using 254 nm wavelength UV light generated from a UV lamp with 1.9 cm (0.75 inch) distance from the membrane surface to the UV lamp and a radiation time of 20 minutes at 50° C. The UV lamp that was used was a low pressure, mercury arc immersion UV quartz 12 watt lamp with 12 watt power supply from Ace Glass Incorporated.

Example 11

$CO_2/CH_4$ Separation Performance of PBO(BTDA-APAF-450C) and Cross-linked PBO(BTDA-APAF-450C) Polymer Membranes The PBO(BTDA-APAF-450C) polymer membrane prepared in Example 4 and the cross-linked PBO(BTDA-APAF- 450C) polymer membrane prepared in Example 5 were tested for $CO_2/CH_4$ separation under testing temperatures of 50° C. and 100° C., respectively (Table 1). It can be seen from Table 1 that the PBO(BTDA-APAF-450C) polymer membrane showed high $CO_2$ permeability ($P_{CO2}$=535.9 Barrer at 50° C. testing temperature) and moderate $CO_2/CH_4$ selectivity (26.0 at 50° C. testing temperature). After cross-linking, the cross-linked PBO(BTDA-APAF-450C) polymer membrane showed significantly increased $CO_2/CH_4$ selectivity (48.4 at 50° C. testing temperature) compared to the PBO(BTDA-APAF-450C) membrane at both 50° C. and 100° C. testing temperature, respectively.

TABLE 1

Pure Gas Permeation Test Results of PBO(BTDA-APAF-450C) and the Cross-Linked PBO(BTDA-APAF-450C) Polymer Membranes for $CO_2/CH_4$ Separation

| Membrane | $P_{CO2}$ (Barrer) | $\alpha_{CO2/CH4}$ |
|---|---|---|
| PBO(BTDA-APAF-450C)[a] | 535.9 | 26.0 |
| PBO(BTDA-APAF-450C)[b] | 477.7 | 12.1 |
| cross-linked PBO(BTDA-APAF-450C)[a] | 219.5 | 48.4 |
| cross-linked PBO(BTDA-APAF-450C)[b] | 325.3 | 19.7 |

[a]$P_{CO2}$ and $P_{CH4}$ were tested at 50° C. and 690 kPa (100 psig);
[b]$P_{CO2}$ and $P_{CH4}$ were tested at 100° C. and 690 kPa (100 psig);
1 Barrer = $10^{-10}$ cm$^3$(STP) · cm/cm$^2$ · sec · cmHg.

Example 12

$H_2/CH_4$ Separation Performance of PBO(BTDA-APAF-450C) and Cross-linked PBO(BTDA-APAF-450C) Polymer Membranes The PBO(BTDA-APAF-450C) polymer membrane prepared in Example 4 and the cross-linked PBO(BTDA-APAF-450C) polymer membrane prepared in Example 5 were tested for $H_2/CH_4$ separation under testing temperatures of 50° C. (Table 2). It can be seen from Table 2 that the cross-linked PBO(BTDA-APAF-450C) polymer membrane showed high $H_2/CH_4$ selectivity of 133 and is more than three times higher than that of the PBO(BTDA-APAF-450C) membrane. These results suggest that the cross-linked PBO(BTDA-APAF-450C) polymer membrane is a good candidate for $H_2/CH_4$ separation.

TABLE 2

Pure Gas Permeation Test Results of PBO(BTDA-APAF-450C) and the Cross-Linked PBO(BTDA-APAF-450C) Polymer Membranes for $H_2/CH_4$ Separation[a]

| Membrane | $P_{H2}$ (Barrer) | $\alpha_{H2/CH4}$ |
|---|---|---|
| PBO(BTDA-APAF-450C) | 652.3 | 31.7 |
| cross-linked PBO(BTDA-APAF-450C) | 604.7 | 133.2 |

[a]$P_{H2}$ and $P_{CH4}$ were tested at 50° C. and 690 kPa (100 psig);
1 Barrer = $10^{-10}$ cm$^3$(STP) · cm/cm$^2$ · sec · cmHg.

Example 13

Propylene/Propane Separation Performance of PBO(BTDA-APAF-450C) and Cross-linked PBO(BTDA-APAF-450C) Polymer Membranes The PBO(BTDA-APAF-450C) polymer membrane prepared in Example 4 and the cross-linked PBO(BTDA-APAF-450C) polymer membrane prepared in Example 5 were tested for propylene/propane separation under testing temperatures of 50° C. (Table 3). It can be seen from Table 3 that the propylene/propane selectivity of the PBO(BTDA-APAF-450C) polymer membrane increased from 12.6 to 19.1 after the membrane was cross-linked by UV radiation. These results suggest that the cross-linked PBO(BTDA-APAF-450C) polymer membrane is also a good candidate propylene/propane separation.

TABLE 3

Pure Gas Permeation Test Results of PBO(BTDA-APAF-450C) and the Cross-Linked PBO(BTDA-APAF-450C) Polymer Membranes for Propylene/Propane Separation[a]

| Membrane | $P_{propylene}$ (Barrer) | $\alpha_{propylene/propane}$ |
|---|---|---|
| PBO(BTDA-APAF-450C) | 14.1 | 12.6 |
| cross-linked PBO(BTDA-APAF-450C) | 3.26 | 19.1 |

[a]$P_{propylene}$ and $P_{propane}$ were tested at 50° C. and 207 kPa (30 psig);
1 Barrer = $10^{-10}$ cm$^3$(STP) · cm/cm$^2$ · sec · cmHg.

Example 14

$CO_2/CH_4$ Separation Performance of PBO(ODPA-APAF-450C) and Cross-linked PBO(ODPA-APAF-450C) Polymer Membranes The PBO(ODPA-APAF-450C) and the cross-linked PBO(ODPA-APAF-450C) polymer membranes prepared in Example 7 and Example 9, respectively, were tested for $CO_2/CH_4$ separation under 690 kPa pure gas pressure at 50° C. (Table 4). It can be seen from Table 4 that the PBO(ODPA-APAF-450C) polymer membrane prepared from poly (ODPA-APAF) polyimide membrane by heat treatment at 450° C. showed $CO_2$ permeability ($P_{CO2}$) of 545 Barrer, which is about 50 times higher than the conventional cellulose acetate polymer membrane under the same testing conditions. However, the $CO_2/CH_4$ selectivity of this PBO (ODPA-APAF-450C) polymer membrane ($\alpha_{CO2/CH4}$=22) is the same as the conventional cellulose acetate polymer membrane. After cross-linking, the cross-linked PBO(ODPA-APAF-450C) polymer membrane showed doubled $CO_2/CH_4$ selectivity ($\alpha_{CO2/CH4}$=45) compared to the uncrosslinked PBO(ODPA-APAF-450C) membrane. The $CO_2$ permeability ($P_{CO2}$) of the cross-linked PBO(ODPA-APAF-450C) polymer membrane is still more than 15 times higher than that of the conventional cellulose acetate polymer membrane.

TABLE 4

Pure Gas Permeation Test Results of PBO(ODPA-APAF-450C) and the Cross-Linked PBO(ODPA-APAF-450C) Polymer Membranes for $CO_2/CH_4$ Separation[a]

| Membrane | $P_{CO2}$ (Barrer) | $\alpha_{CO2/CH4}$ |
|---|---|---|
| PBO(ODPA-APAF-450C) | 544.9 | 22.0 |
| cross-linked PBO(ODPA-APAF-450C) | 185.8 | 45.0 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Example 15

$CO_2/CH_4$ Separation Performance of PBO(ODPA-APAF-400C) and Cross-linked PBO(ODPA-APAF-400C) Polymer Membranes The PBO(ODPA-APAF-400C) and the cross-linked PBO (ODPA-APAF-400C) polymer membranes prepared in Example 8 and Example 10, respectively, were tested for $CO_2/CH_4$ separation under 690 kPa pure gas pressure at 50° C. (Table 5). It can be seen from Table 5 that the PBO(ODPA-APAF-400C) polymer membrane prepared from poly(ODPA-APAF) polyimide membrane by heat treatment at 400° C. showed $CO_2$ permeability ($P_{CO2}$) of 143 Barrer, which is about 13 times higher than the conventional cellulose acetate polymer membrane under the same testing conditions. The $CO_2/CH_4$ selectivity of this PBO(ODPA-APAF-400C) polymer membrane ($\alpha_{CO2/CH4}$=32) is about 45% higher than that of the conventional cellulose acetate polymer membrane. After cross-linking, the cross-linked PBO(ODPA-APAF-400C) polymer membrane showed further increased $CO_2/CH_4$ selectivity ($\alpha_{CO2/CH4}$=45) compared to the uncrosslinked PBO(ODPA-APAF-400C) membrane. The $CO_2$ permeability ($P_{CO2}$) of the cross-linked PBO(ODPA-APAF-400C) polymer membrane is still about 8 times higher than that of the conventional cellulose acetate polymer membrane.

TABLE 5

Pure Gas Permeation Test Results of PBO(ODPA-APAF-400C) and the Cross-Linked PBO(ODPA-APAF-400C) Polymer Membranes for $CO_2/CH_4$ Separation[a]

| Membrane | $P_{CO2}$ (Barrer) | $\alpha_{CO2/CH4}$ |
|---|---|---|
| PBO(ODPA-APAF-400C) | 143.0 | 31.8 |
| cross-linked PBO(ODPA-APAF-400C) | 88.2 | 45.0 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Comparable Examples

Five process simulation examples were studied to compare the high gas permeability cross-linked polybenzoxazole polymer membranes with the commercially available membranes. Comparable Example 1 was a single stage system using the currently commercially available membranes. Comparable Examples 2 and 3 were single stage systems using the high gas permeability cross-linked PBO(BTDA-APAF-450C) membrane listed in Table 1. Comparable Example 1 and Example 2 were operated at feed temperature of 50° C. In order to have a sufficient dew point margin preventing liquid condensation on the membrane surface during the operation, a pretreatment regenerable adsorbent system called MemGuard™ that uses molecular sieves developed by UOP LLC, was applied in these two examples. Comparable Example 3 was operated at high feed temperature of 100° C. due to the high thermal and mechanical stability of the cross-linked polybenzoxazole polymer membranes. Since sufficient dew point margin was provided by operating the membrane system at the high temperature, no pretreatment system was required in Comparable Example 3.

In order to improve the recovery of hydrocarbons from the natural gas stream, a two-stage membrane system was studied. In Comparable Example 4, commercially available membranes were used for both first and second stages. A pretreatment system such as MemGuard™ would be required for Comparable Example 4. In Comparable Example 5, high gas permeability cross-linked PBO(BTDA-APAF-450C) membrane was used for both first- and second-stage membranes. Comparable Example 5 operated the first stage at an elevated temperature to provide a sufficient dew point margin for the product gas. No pretreatment system was required for Comparable Example 5. The second stage of Comparable Example 5 was operated at 50° C. feed temperature to increase the membrane selectivity, hence, reduce the hydrocarbon loss. Since heavy hydrocarbons are hard to reach a second stage feed, the pretreatment unit such as MemGuard™ was not required.

Comparable Examples 1, 2, and 3 assumed a natural gas feed with 8% $CO_2$, and the product spec for $CO_2$ is at 2%. In Comparable Example 1, the commercially available membrane was assumed to be a membrane with typical performance in the current natural gas upgrading market. In Comparable Examples 2 and 3, the cross-linked PBO(BTDA-APAF-450C) (shown in Table 1) material was used to make the membrane with a thickness of 200 nm. The permeance of the new high gas permeability cross-linked PBO(BTDA-APAF-450C) polymer membrane was assumed at 0.030 m$^3$(STP)/m$^2$.h.kPa at 50° C. and 0.044 m$^3$(STP)/m$^2$.h.kPa at 100° C. based on the permeability measured for the dense membrane, and the selectivities were assumed at 44 at 50° C. and 15 at 100° C., which are lower than the selectivities shown in Table 1. A process simulation based on the above performance was performed for Comparable Examples 1, 2 and 3. The results are shown in Table 6.

TABLE 6

Simulation Results for Comparable Examples 1, 2 and 3

| | Comparable Example 1 | Comparable Example 2 | Comparable Example 3 |
|---|---|---|---|
| Feed Flow, m$^3$(STP)/h | 5.9 × 10$^5$ | 5.9 × 10$^5$ | 5.9 × 10$^5$ |
| CO2 in Feed, % | 8 | 8 | 8 |
| CO2 in Product Required, % | 2 | 2 | 2 |
| MemGuard ™ bed Required? | Yes | Yes | No |
| Membrane Feed Temperature, ° C. | 50 | 50 | 100 |
| Membrane Feed Pressure, kPa | 3792.3 | 3792.3 | 3792.3 |
| Membrane Area Saved, % | — | 59.8 | 82.6 |
| Total Hydrocarbon Recovery, % | Base | 7.4 | −2.8 |

It can be seen by comparing the above examples that Comparable Example 2 showed significant cost saving (59.8% less membrane area required) and higher hydrocarbon recovery (7.4% more) compared to Comparable Example 1. Comparable Example 3 not only can save the membrane area (82.6%), but also can eliminate the costly MemGuard™ pretreatment system at slightly lower hydrocarbon recovery. It is anticipated that the new high gas permeability and high selectivity cross-linked polybenzoxazole polymer membrane system will significantly reduce the membrane system cost and footprint which is extremely important for large offshore gas processing projects.

The hydrocarbon recovery can be increased by running a two stage membrane system as shown in Comparable Examples 4 and 5. In Comparable Example 4, both stages applied the commercially available membranes with the performance data the same as those in Comparable Example 1. In Comparable Example 4, the cross-linked PBO(BTDA-APAF-450C) polymer membrane was used for both first stage and second stage. The first stage was operated at elevated temperature to eliminate the MemGuard™ system. The second stage was operated at lower temperature to increase the selectivity. The natural gas feed in Comparable Examples 3 and 4 had been changed to 45% $CO_2$ (more meaningful for a two-stage system), and the product specification for $CO_2$ in these two examples were assumed at 8%. Table 7 shows the results of the simulation for Comparable Examples 4 and 5.

TABLE 7

Simulation Results for Comparable Examples 4 and 5

| | Comparable Example 4 | Comparable Example 5 |
|---|---|---|
| Feed Flow, $m^3$(STP)/h | $5.9 \times 10^5$ | $5.9 \times 10^5$ |
| $CO_2$ in Feed, % | 45 | 45 |
| $CO_2$ in Product Required, % | 8 | 8 |
| Pretreatment required? | Yes | No |
| $1^{st}$ Stage Membrane Feed Temperature, °C. | 50 | 100 |
| $1^{st}$ Stage Membrane Feed Pressure, kPa | 3792.3 | 3792.3 |
| $2^{nd}$ Stage Membrane Feed Temperature, °C. | 50 | 50 |
| 2nd Stage Membrane Feed Pressure, kPa | 3902.6 | 3902.6 |
| $1^{st}$ Stage Membrane area | Base | 20.5% |
| $2^{nd}$ Stage Membrane area | Base | 40.8% |
| Total Compressor Horse Power | Base | 107.5% |
| Total Hydrocarbon Recovery, % | 96.9 | 97.1 |

It can be seen from Table 7 that Comparable Example 4 and Comparable Example 5 have very similar hydrocarbon recovery. Due to the high temperature operation for the first stage membrane, Comparable Example 5 does not require a pretreatment such as a MemGuard™ system, which is about 10 to 40% of the total cost of Comparable Example 4. At the same time, the first stage membrane area is reduced by 79.5% and the second stage membrane area is reduced by 59.2% from Comparable Example 4 to Comparable Example 5. It can be expected that the Comparable Example 5 will have a big capital (>50%) and footprint (>50%) saving compared to Comparable Example 4. The only drawback is that the compressor will be slightly bigger. Table 7 shows a 7.5% horse power increase from Comparable Example 4 to Comparable Example 5.

The invention claimed is:

1. A process for separating at least one gas or liquid from a mixture of gases or liquids using a cross-linked polybenzoxazole or polybenzothiazole polymer membrane, said process comprising:

a) providing a cross-linked polybenzoxazole or polybenzothiazole polymer membrane prepared from cross-linkable polyimide polymers comprising cross-linkable functional groups found in a backbone of said cross-linkable polyimide polymers and pendent —OH or —SH groups ortho to a heterocyclic imide nitrogen wherein said cross-linkable polyimide polymers are first converted to a polybenzoxazole or a polybenzothiazole polymer by thermal conversion and then said polybenzoxazole or said polybenzothiazole polymer is subjected to a crosslinking treatment wherein said cross-linked polybenzoxazole or polybenzothiazole polymer membrane is permeable to at least one gas or liquid;

b) contacting a mixture of gases or liquids on one side of the cross-linked polybenzoxazole or polybenzothiazole polymer membrane to cause at least one gas or liquid to permeate the cross-linked polybenzoxazole or polybenzothiazole polymer membrane; and c) removing from an opposite side of the membrane a permeate gas or liquid composition that is a portion of said at least one gas or liquid that permeated the membrane wherein said crosslinkable polyimide polymers comprise a plurality of first repeating units of a formula (II), wherein formula (II) is:

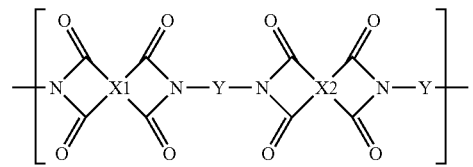

(II)

wherein X1 of formula (II) is selected from the group consisting of

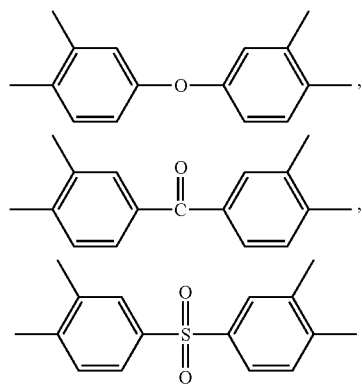

and mixtures thereof, X2 of formula (II) is either the same as X1 or is selected from the group consisting of

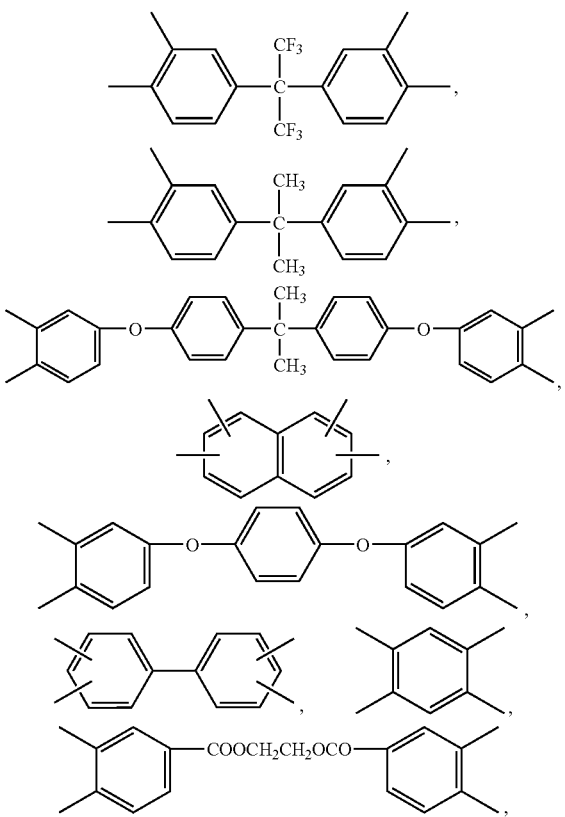

-continued

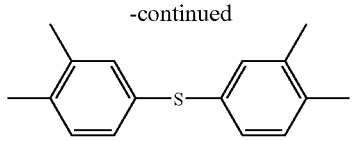

and mixtures thereof, —Y— of formula (II) is selected from the group consisting of

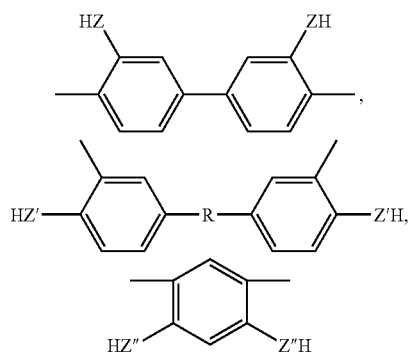

and mixtures thereof, —Z—, —Z'—, and —Z"— are independently —O— or —S—, and —R— is selected from the group consisting of

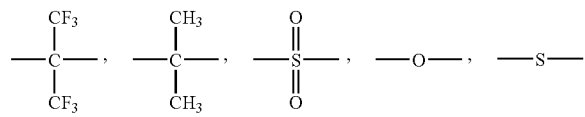

and mixtures thereof.

2. The process for separating at least one gas or liquid from a mixture of gases or liquids of claim 1 wherein said gases are mixtures selected from the group consisting of $CO_2/CH_4$, $CO_2/N_2$, $H_2/CH_4$, $O_2/N_2$, $H_2S/CH_4$, olefin/paraffin, and iso paraffins/normal paraffins.

3. The process of claim 1 wherein said gas or liquid comprises at least one volatile organic compound in an atmospheric gas.

4. The process of claim 1 wherein said gases or liquids comprise a mixture of hydrogen, nitrogen, methane and argon in an ammonia purge stream.

5. The process of claim 1 wherein said gases or liquids comprise hydrogen from a hydrocarbon vapor stream.

6. The process of claim 1 wherein said gases or liquids comprise a mixture of at least one pair of gases selected from the group consisting of nitrogen and oxygen, carbon dioxide and methane, and hydrogen and methane or a mixture of carbon monoxide, helium and methane.

7. The process of claim 1 wherein said gases or liquids comprise natural gas comprising methane and at least one gas component selected from the group consisting of carbon dioxide, oxygen, nitrogen, water vapor, hydrogen sulfide, helium and other trace gases.

8. The process of claim 1 wherein said gases or liquids comprise hydrocarbon gases, carbon dioxide, hydrogen sulfide and mixtures thereof.

9. The process of claim 1 wherein said gases or liquids comprise a mixture of organic molecules and water.

10. The process of claim 1 wherein said cross-linked polybenzoxazole or polybenzothiazole polymer membrane is used at a temperature from about −50° C. to 100° C.

11. The process of claim 1 wherein said cross-linked polybenzoxazole or polybenzothiazole is used at a temperature from about 20° C.-70° C.

12. A process of separating liquid mixtures by pervaporation wherein said process comprises contacting a cross-linked polybenzoxazole or polybenzothiazole polymer membrane prepared from cross-linkable polyimide polymers comprising cross-linkable functional groups found in a backbone of said cross-linkable polyimide polymers and pendent —OH or —SH groups ortho to a hetrocyclic imide nitrogen with a liquid mixture comprising at least one organic compound wherein said crosslinkable polyimide polymers comprise a plurality of first repeating units of a formula (II), wherein formula (II) is:

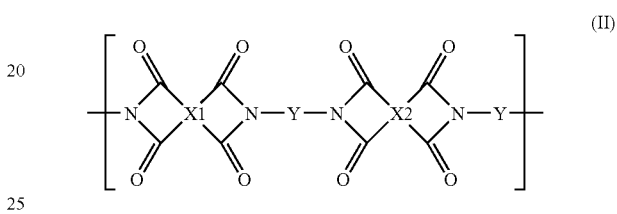

wherein X1 of formula (II) is selected from the group consisting of

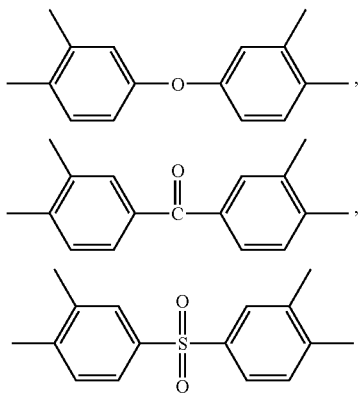

and mixtures thereof, X2 of formula (II) is either the same as X1 or is selected from the group consisting of

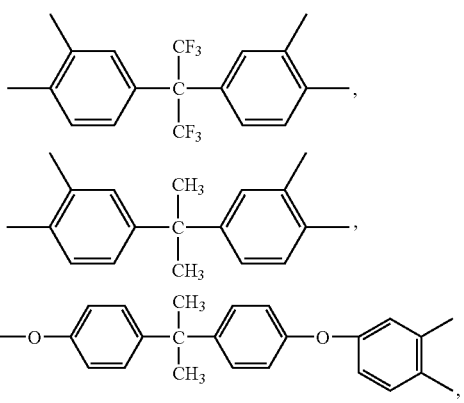

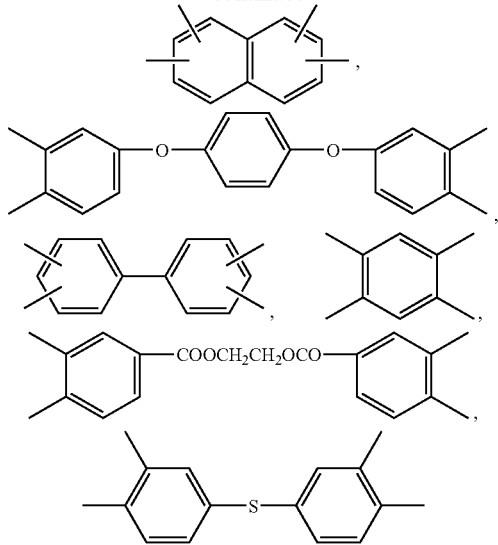

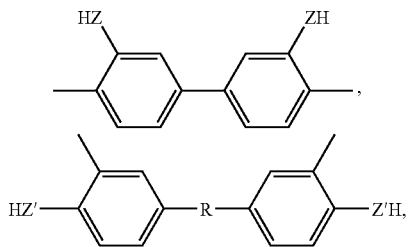

and mixtures thereof, —Y— of formula (II) is selected from the group consisting of

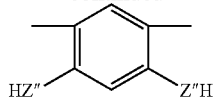

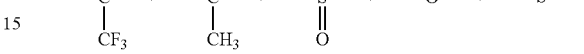

and mixtures thereof, —Z—, —Z'—, and —Z"— are independently —O— or —S—, and —R— is selected from the group consisting of

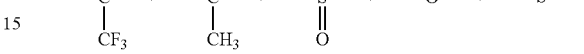

and mixtures thereof.

13. The process of claim 12 wherein said organic compound is selected from the group consisting of alcohols, phenols, chlorinated hydrocarbons, pyridines and ketones.

14. The process of claim 12 wherein said liquid mixture comprises a mixture of sulfur compounds with gasoline or diesel fuels.

15. The process of claim 12 wherein said liquid mixture comprises a mixture selected from the group consisting of ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

* * * * *